United States Patent
Jang

(10) Patent No.: US 8,103,100 B2
(45) Date of Patent: Jan. 24, 2012

(54) SYSTEM OF IMPLEMENTING USER HANDWRITING AND METHOD THEREOF

(76) Inventor: Kyung-Ho Jang, Seoul (KR)

( * ) Notice: Subject to any disclaimer, the term of this patent is extended or adjusted under 35 U.S.C. 154(b) by 533 days.

(21) Appl. No.: 12/376,466

(22) PCT Filed: Aug. 16, 2007

(86) PCT No.: PCT/KR2007/003914
§ 371 (c)(1),
(2), (4) Date: Feb. 5, 2009

(87) PCT Pub. No.: WO2008/020714
PCT Pub. Date: Feb. 21, 2008

(65) Prior Publication Data
US 2010/0166312 A1    Jul. 1, 2010

(30) Foreign Application Priority Data
Aug. 16, 2006 (KR) .......................... 10-2006-0077271

(51) Int. Cl.
*G06K 9/00* (2006.01)
(52) U.S. Cl. ....................................................... 382/187
(58) Field of Classification Search .................. 382/151, 382/173, 181, 186–187, 190
See application file for complete search history.

(56) References Cited

U.S. PATENT DOCUMENTS
7,349,576 B2 * 3/2008 Holtsberg ...................... 382/187

FOREIGN PATENT DOCUMENTS
| JP | 2004-004302 | 1/2004 |
| KR | 1019990083472 | 11/1999 |
| KR | 1020000036448 | 7/2000 |
| KR | 1020010073976 | 8/2001 |
| KR | 1020050012864 | 2/2005 |

* cited by examiner

*Primary Examiner* — Daniel Mariam
(74) *Attorney, Agent, or Firm* — Harness, Dickey & Pierce, P.L.C.; Anthony G. Fussner; Kisuk Lee

(57) ABSTRACT

System for implementing user handwriting according to the present invention, comprising : a handwriting input module (120) for receiving user handwriting including at least 100 to 200 characters by a user with sample sentences; a feature determining module (150); a distance determining module (160) for determining a vertical distance between an uppermost point mark and a lowermost point mark between 2 characters and their segments and a horizontal distance between a leftmost point mark and a rightmost point mark between 2 characters and their segments; a position determining module (170) for determining positions of the uppermost and lowermost point marks and the leftmost and rightmost point marks between 2 characters and their segments; a handwriting combining module (180) for combining several handwriting base on data recognized by the feature determining module (150), the distance determining module (160) and the position determining module (170); and a handwriting output module (200) for outputting handwriting combined by the handwriting combining module (180).

10 Claims, 5 Drawing Sheets

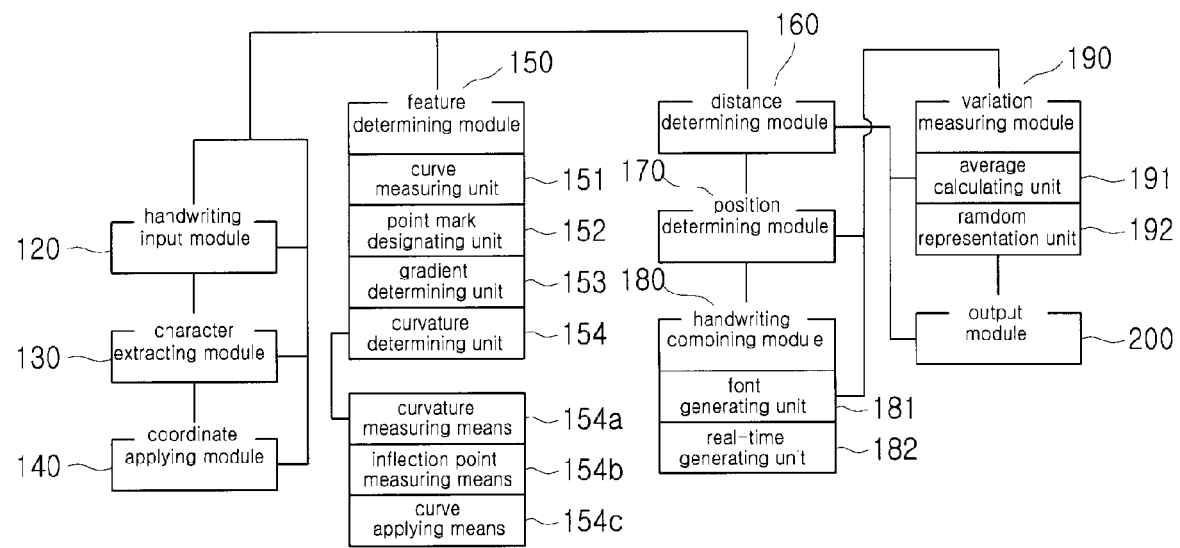
[Fig. 1]
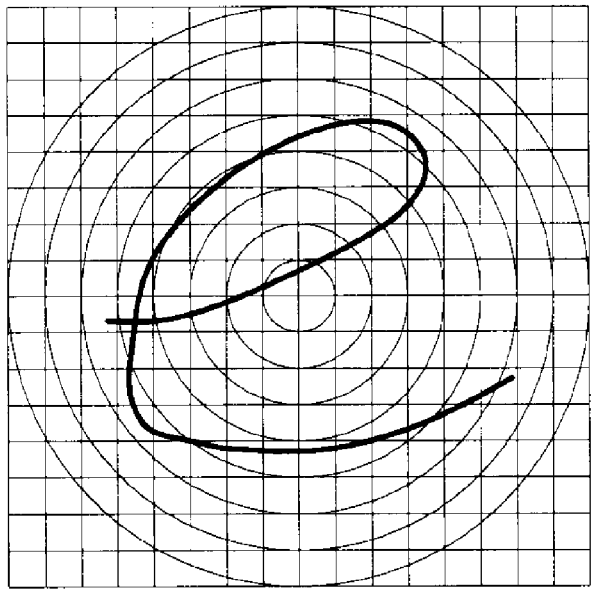
[Fig. 2]

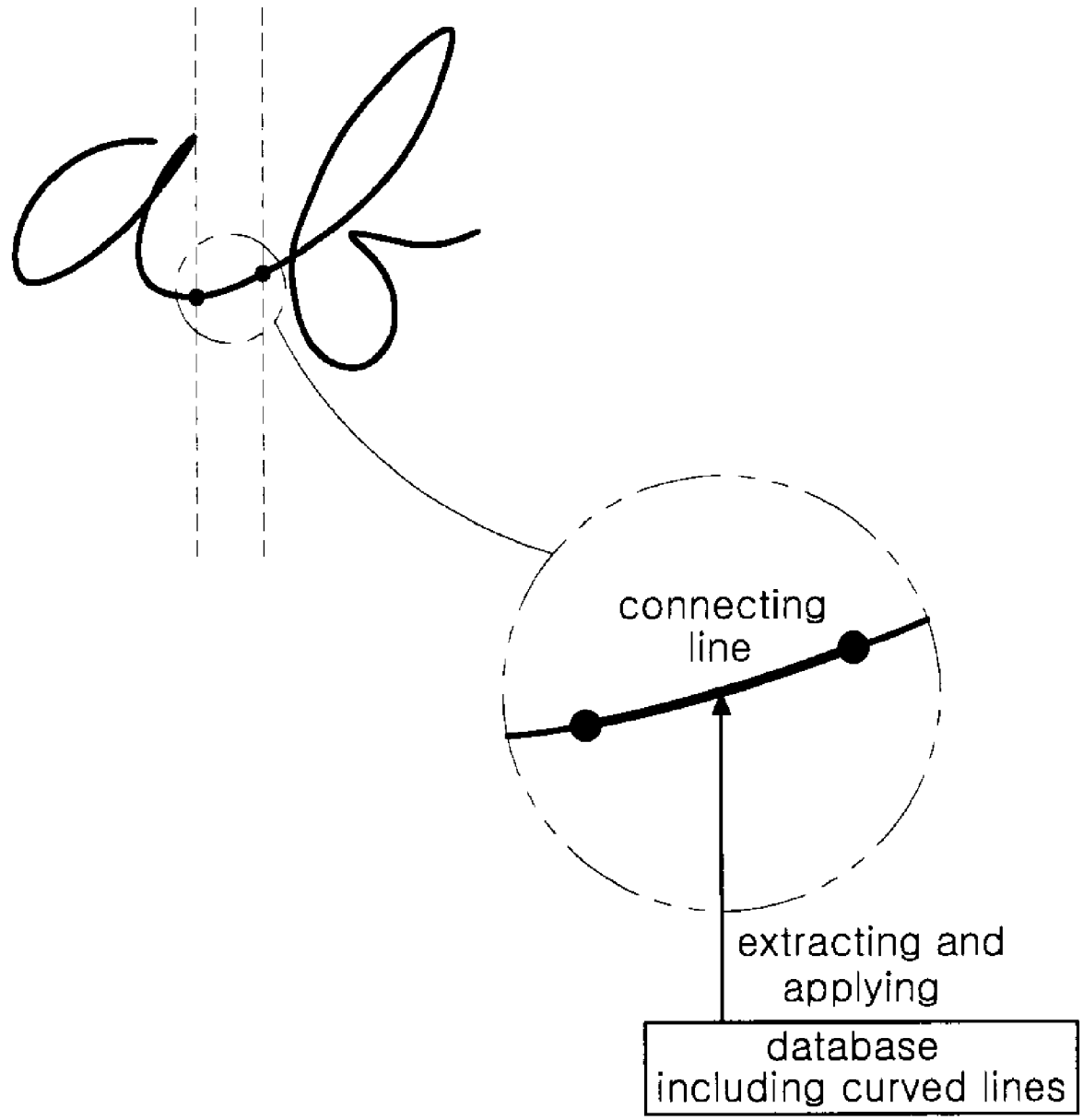
[Fig. 3]

[Fig. 4]
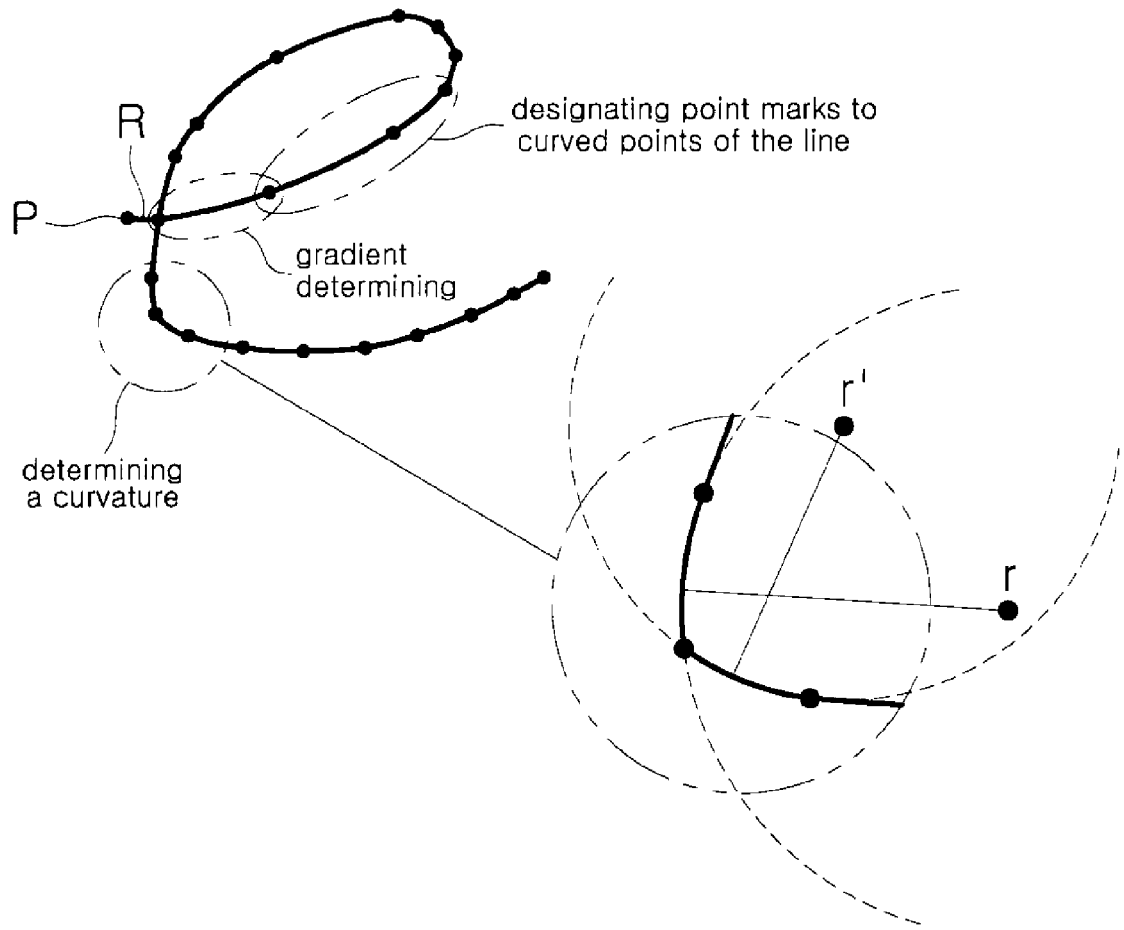
[Fig. 5]
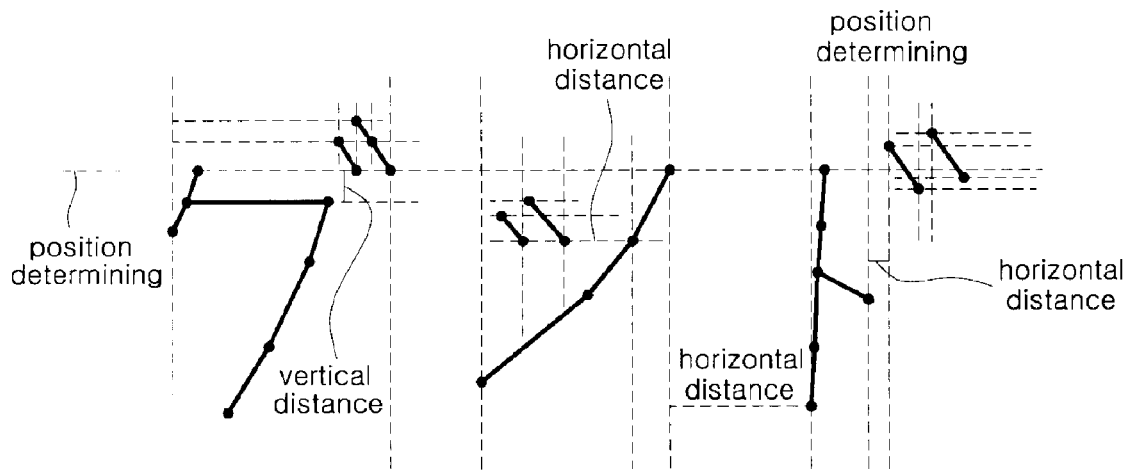

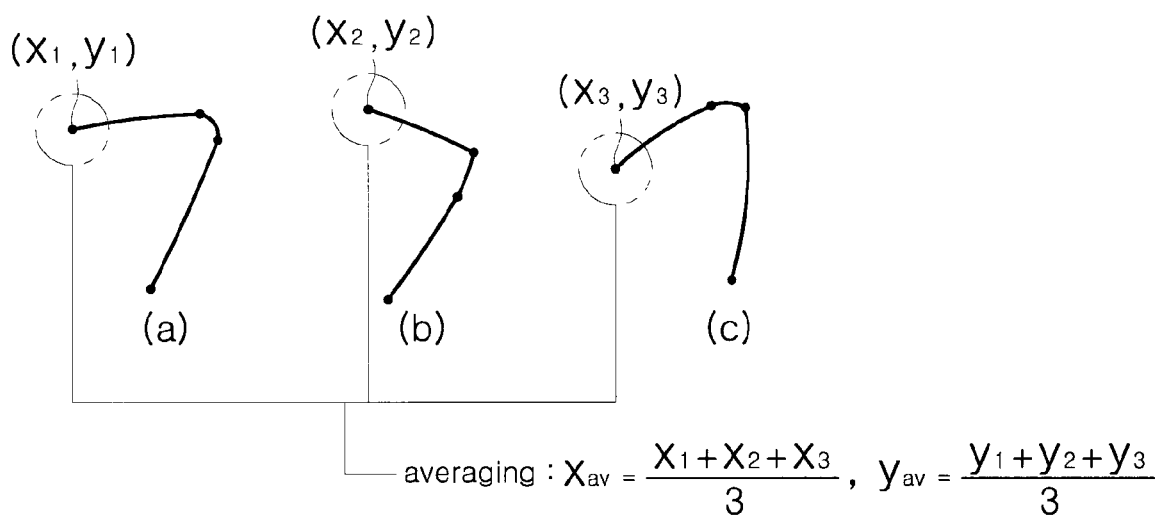

[Fig. 7]
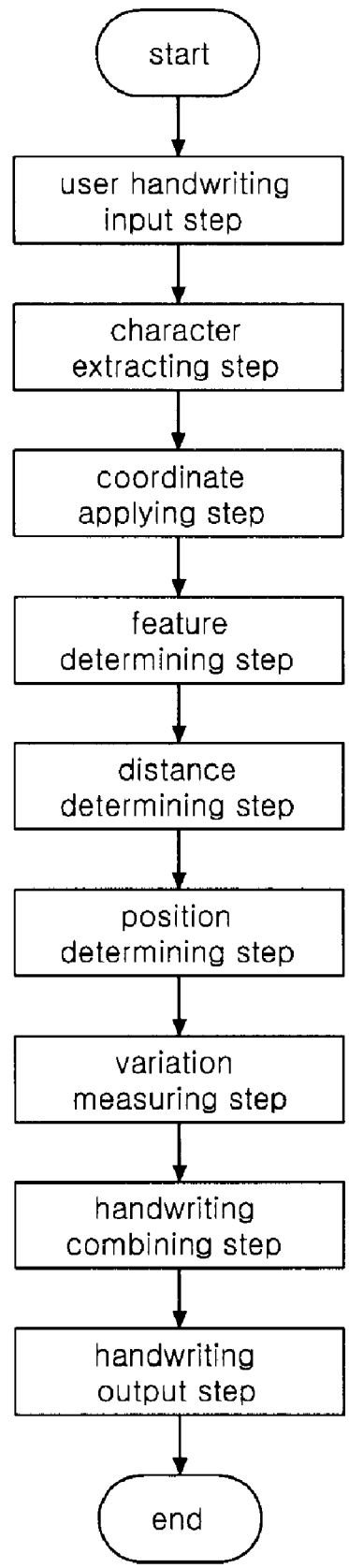

SYSTEM OF IMPLEMENTING USER HANDWRITING AND METHOD THEREOF

CROSS REFERENCE TO RELATED APPLICATIONS

This is a national phase application of PCT International Application No. PCT/KR2007/003914 filed Aug. 16, 2007 (Publication No. WO 2008/020714), which claims priority to Korean Application No. 10-2006-0077271 filed Aug. 16, 2006. The disclosures of the above applications are incorporated herein by reference.

TECHNICAL FIELD

The present invention relates to a system and method for implementing user handwriting and more particularly a system and method for receiving user handwriting having individual characteristics, deducing personal handwriting from the user handwriting and representing the personal handwriting into a document by an automatic handwriting conversion.

BACKGROUND ART

Currently, with the advancement in various documentation programs the document which was handwritten by a user as in the past have become scarcely discovered and it is predicted in the future that the handwritten document will progressively hardly be discovered due to convergence of the convenient usability of various documentation programs and a variety of writing font resulting from the font development.

Of course, in case the document is drawn by the documentation program, such a document can provide neat and tidy image which can be delivered to a recipient, so the document drawn by the documentation programs will become more actively used for the resume or the official document and the like mainly requiring formality and furthermore the document drawn by the documentation programs will become widely used for the letter or the report or the private document.

By the way, although the documents drawn by the documentation programs have clean impression the documents drawn by the documentation programs have problems that they have not individual writing styles thereby discarding personal writing characteristics of user handwriting and formulating personal writing into the document with a standard font and so the documents drawn by the documentation programs cannot deliver intimate and warm impression to a recipient.

In particular, as the writing font drawn by the documentation programs may deliver a cold (or, formal) impression to a recipient, the writing font drawn by the documentation programs may have a problem that it cannot be used in the documents which need to deliver a human (affective) impression such as a love letter, an affectionate letter and the like.

In order to overcome these problems, the system and method for implementing personal writing using the computer has been developed. As an example Korean Patent laid-open publication No. 2000-36448 is disclosed entitled 'Apparatus for implementing a user writing', characterized in that it comprises an input for reading the user writing; a font processor for generating a font corresponding the user writing; a database for storing generated font; and an automatic conversion unit for automatically converting character inputted from the input into personal writing font. But in the above Korean Patent, the contents as to how to read the personal writing and how to generate a font by what criterion were not described, it does not seem that the Korean Patent had significant technical contents enough to be considered as a reference.

Currently, considering the prior art regarding implementing the personal writing, a significant number of techniques representing user writing into a document by automatically recognizing the personal writing with high accurate rate were disclosed.

In the case, the techniques are related to recognizing various writing of many persons, each person having ambiguous or various writing with a various specific manner, for example, a circular matching method, a method using a concealing markrope model or the like, base on the Optical Character Reader (OCR) for recognizing a part corresponding to a character with a scanner.

By the way, the prior art techniques represent a method for recognizing/reading personal writing by an apparatus like a computer but not represent a method for deducing and generalizing characters inputted with the computer with a specific manner and then outputting deduced and generalized characters in the form of a personal writing style.

To generalize the personal writing, it is contemplated that a possible method is to input characters handwritten by a person, as many as possible, to recognize characteristics from each of the personal handwritten characters and to generate and store standard fonts corresponding to the characteristics in a database. But this method has problems that it is not practical and economical to read all the characters and generate fonts corresponding to all the characters in case a character in Chinese language consists of a large number of segments (strokes) or a word consists of 10 or more hiragana or katakana characters in Japanese language. Furthermore, this method has problems in that it unnecessarily takes a memory-capacity and the processing rate can be considerably delayed.

Therefore, it is a need for a system and method for implementing a personal handwriting with a faster and more accurate manner by a new user handwriting deducing method capable of representing all the characters from minimum number of characters of user handwriting.

DISCLOSURE OF INVENTION

Technical Problem

The present invention is intended to solve the above mentioned problems and the main object of the present invention is to provide a system for implementing personal handwriting base on an economic and efficient handwriting deducing method capable of receiving only a minimum number of representative characters of user handwriting by a user and then deducing all the characters.

The other object of the present invention is to provide a method for dividing a character into segments with finite point marks and then connecting the point marks by linear lines or curve lines with a coordinate system for recognizing individual character scripts of user handwriting.

Another object of the present invention is to provide a step and a means for determining a distance between and a position of characters.

The further object of the present invention is to provide a system and method for implementing standardized handwriting by receiving a plurality of characters and measuring the variation of each character taking into account possibility that the same character will be recognized as other characters according to circumstances.

Technical Solution

A system for implementing user handwriting according to the present invention to achieve the object, comprises:

a handwriting input module 120 for receiving user handwriting including at least 100 to 200 characters by the user with sample sentences;

a feature determining module 150 having a curve measuring unit 151 for recognizing a curve condition of a run portion R in each character and its segments in the handwriting, a point mark designating unit 152 for designating a point mark P to a curved position of the run portion R recognized by the curve measuring unit 151, a curvature determining unit 154 including a curvature measuring means 154a for designating only a specific number of the point mark P if the run portion R is a curved line and a curve applying means 154c for determining whether the curved line determined by the curvature measuring means 154a matches an arc segment of a predetermined circle;

a distance determining module 160 for determining a vertical distance between an uppermost point mark and a lowermost point mark between adjacent 2 characters and their segments and a horizontal distance between a leftmost point mark and a rightmost point mark between adjacent 2 characters and their segments;

a position determining module 170 for determining the positions of the uppermost and lowermost point marks and the leftmost and rightmost point marks between adjacent 2 characters and their segments;

a handwriting combining module 180 for combining several handwriting bases on data recognized by the feature determining module 150, the distance determining module 160 and the position determining module 170; and a handwriting output module 200 for outputting handwriting combined by the handwriting combining module 180.

Advantageous Effects

The system and method for implementing user handwriting according to the present invention has advantages that:

1) a numerous number of characters can be accurately represented in spite of the minimum number of handwriting characters of a user and the memory capacity of the system will be reduced and the processing rate of the system will be faster;

2) various and more vivider handwriting styles of the user will be implemented to conform to varied user handwriting; and 3) the handwriting characters represented in various user handwriting will be represented arbitrarily by accurately and fast measuring and outputting the distance between characters and the position and the feature of characters.

BRIEF DESCRIPTION OF THE DRAWINGS

FIG. 1 shows a schematic block diagram of a system for implementing user handwriting according to the present invention.

FIG. 2 is a conceptional diagram representing a status using a coordinate plate of a system for implementing user handwriting according to the present invention.

FIG. 3 is a conceptional diagram illustrating a status implemented as an English cursive script in a system for implementing user handwriting according to the present invention.

FIG. 4 is a conceptional diagram representing a principle performed in a step of determining a feature of the characters in a system for implementing user handwriting according to the present invention.

FIG. 5 is a conceptional diagram representing a principle performed in steps of determining a distance between and positions of characters in a system for implementing user handwriting according to the present invention.

FIG. 6 is a conceptional diagram showing a procedure for obtaining an average value of measured coordinate values for a variation in a system for implementing user handwriting according to the present invention.

FIG. 7 shows a flow chart representing a basic process of a method for implementing user handwriting according to the present invention.

BRIEF DESCRIPTION OF THE REFERENCE NUMERALS

120: handwriting input module 154c: curve applying means
130: character extracting module 160: distance determining module
140: coordinate applying module 170: position determining module
150: feature determining module 180: handwriting combining module
151: curve measuring unit 190: variation measuring unit
152: point mark designating unit 200: output module
154: curvature determining unit P: point mark
154a: curvature measuring unit R: run portion Mode for the Invention The detailed description of the present invention will now be described with reference to the accompanying drawings. The drawings are not to scale in which similar or identical reference number represents a similar or identical part.

FIG. 1 is a block diagram representing overall configuration for the system for implementing user handwriting according to the present invention.

First of all, the principle of the system according to the present invention applies to English, Korean and even Chinese in which the number of a segment (stroke) consisting of a character is generally larger than that of other languages.

Referring to FIG. 1, the system for implementing user handwriting according to the present invention, comprises:

a handwriting input module 120 for receiving user handwriting;

a coordinate applying module 140 for applying the coordinate plate to the handwriting to analyze the user handwriting with a coordinate system;

a character extracting module 130 for extracting the part of characters only from the user handwriting;

a feature determining module 150 for analyzing and recognizing a specific feature of user handwriting;

a distance determining module 160 for measuring and recognizing a distance between characters and segments of a character;

a position determining module 170 for measuring and recognizing a position of each character;

a handwriting combining module 180 for combining several handwriting based on data analyzed by the modules 150, 160, 170;

a variation measuring module 190 for processing handwriting with varied status of characters from user handwriting inputted 2 or more times by a user; and an output module 200 for outputting handwriting to a monitor or a printer.

Hereinafter brief description of the above respective element will be described.

The handwriting input module 120 is a means for inputting user handwriting, such as an image scanner or an image pickup. The handwriting input module 120 serves to perform the function that represents predetermined sentences to a user containing a specific number of characters intended to be handwritten essentially again by the user and for receiving user handwriting for the represented sentences into the system according to the present invention.

In case the sentences are represented to the user, customary paper will be used, but the section paper (graph paper) with a scale marked based on a coordinate plate which will be described later is preferably used.

The character extracting module 130 performs a function that extracts only the character part of the contents inputted by the handwriting input module 120 and recognizes characters separately in the character part except a noise or non-character part outside the character part.

This function serves to exclude unnecessary drawing parts, for example, senseless dots or lines except a character to prevent an error in recognition. In particular, in case a user makes inadvertently erroneous input for a character, for example, if the user handwrites 'F' not 'E' in a place representing 'E', a user input error may be also indicated to the user based on a database containing presumed features of characters including 'E' and 'F' and schematic indices for differentiating characters including 'E' and 'F' contained in the database.

The coordinate applying module 140 serves to perform a pre-processing step for specifying a feature and a position of a character and a distance between characters and segments of a character by applying a coordinate plate to characters transmitted from the character extracting module 130.

A coordinate plate is used to obtain numerical values of characters and segments of a character on a coordinate system to determine characters and segments of each character so that the characters and segments consisting of a character can be extracted and analyzed to obtain personal characteristics of each character.

FIG. 2 is a conceptional diagram representing a schematic configuration for the coordinate plate used in the system according to the present invention.

As seen in FIG. 2, the coordinate plate comprises scale and numerical values of a horizontal and vertical components ($x_i$, $y_i$) for characters and segments of a character on a section paper and scale values represented in a circular form to easily recognize the radius of character the part or the ratio of the circumference of a curved line to its diameter in the character part. The characteristics of characters will be recognized by subdividing and analyzing continuous lines consisting of a character into segments with scale values on the coordinate plate.

The feature determining module 150 according to the present invention comprises a curve determining unit 151, a point mark designating unit 152, a gradient determining unit 153, and a curvature determining unit 154 to determine features of each characters and segments of the character.

The curve measuring unit 151 serves to approximately classify the segments consisting of continuous lines, that is, run portion R which is defined by a portion having continuous black pixel elements for the character into a linear line and a curve line.

More particularly, the curve measuring module 151 performs a function that recognizes a specific portion which is curved or bended in the run portion R to recognize the features of characters and their segments in the first step. To this end, the curve measuring module 151 is systematically cooperated with the gradient determining unit 153 and the curvature determining unit 154 which will be more described later to select a position in which a gradient of the linear line is varied or a curvature of the curve line is varied.

The point mark designating unit 152 serves to specify a point mark P that represents a point, i.e., a position in which variation occurred if the portion with the variation were recognized by the curve measuring unit 151 and recognize the coordinate components of the point marks P and the number of the point marks P determined in characters and segments of a character and store them in the database of the system according to the present invention.

The point marked P in which variation occurred in a segment may be easily finitely designated if the segment is a linear line. But the number of the point marked P in which variation occurred in a segment may be infinite if the segment recognized is a circle or a continuously curved line like alphabet 'O' in which the gradient is continuously varied. In this case the segment is a curved line, only the positions in which $F'(x)=0$, i.e., the gradient of the line by first order differentiation is 0 or only the points in which $F''(x)=0$, i.e., the inflection point or curvature of the line by second order differentiation is varied and may be selected to designate the specific number of point marked P.

The gradient determining unit 153 serves to calculate the gradient of a segment between the adjacent Point marked P in the run portion R, and in particular to deduce the linear line function corresponding the run portion R by applying the coordinate system to the segment of the Run portion in case the Run portion R between the specific Point marked P is linear to reduce the time period required to extract the coordinate components corresponding the linear segment of the Run portion in a pixel by pixel manner, thereby preventing the time consuming operation required to extract the linear line according to whether the pixel elements each is black or white and providing advantages capable of deducing rapidly the linear segments consisting of the characters.

The curvature determining unit 154 serves to recognize the characteristics of the curve in case the segment between the specific Points P in the Run portion is curved, comprising the curvature measuring means 154a, the inflection point measuring means 154b, and the curve applying means 154c.

The curvature measuring means 154a serves to recognize the gradient of the curved line or the ratio of the circumference of the curved line to its diameter by differentiating the coordinate values of the curved line to recognize the degree how much the line is curved at which point, i.e., the curvature of the curved line in cooperation with the curve measuring unit 151.

The inflection point measuring means 154b serves to recognize the degree how much the gradient of the curved line is varied in each curve by second order differentiating the curved line to assist to designate a point mark to the inflection point in which gradient of the line is zero by second order differentiation and also more easily recognize the detail variation of the curved line.

The curve applying means 154c serves to perform the operation for processing easily the curved line in case numerous variations in a segment having a short distance between point marks P are made or a character is expressed in a cursive script. More particularly the curve applying means 154c serves to divide the curved line into several segments by designating point marks to the ends of segments in which curvature variation is varied and extract the segments divided by the point marks and applying proper curve pattern stored in the database containing predetermined curved lines to the divided segment, or applying proper curved patterns stored in the database matching to the curved line connecting between end point of one character and start point of an adjacent following character when a specific line has a numerous variation in gradient like a cursive script in the presumption that connection line between the characters has a regular rule and is in a formulated forms in the cursive script.

FIG. 3 is a conceptional diagram showing as an example a method for implementing a cursive script in English language using the curve applying means according to the present invention.

As seen in FIG. 3, the curve applying means 154c according to the present invention serves to set a right end point (the left black circle point shown in the circle in FIG. 3) and a left starting point (the right black circle point shown in the circle in FIG. 3) of a curved line connecting between characters a and b in the cursive script, extract from the database a curved pattern most matching to the curved line connecting between the cursive script character a and the cursive script character b, and apply the extracted pattern to the curved line connecting between the cursive script character a and the cursive script character b to combine the user handwriting later.

Of course, it is possible that the curved lines connecting between characters in the user handwriting may be deduced by receiving as the input the user handwriting in a cursive script one or more times from the user. But as in this case the number of combination by which alphabet characters may be combined each other may amount to 26*26=676 in English language, it is economical and practical to deduce the cursive script handwriting by using the curve applying means 154c.

FIG. 4 is a conceptional diagram showing as an example a method for designating a point mark to the line, determining a gradient of the line and determining a curvature of the line in the system according to the present invention.

As shown in FIG. 4, a part of the specific line having constant gradient is selected and the point mark P is designated to the position in which the curvature is varied. In particular the curve applying means 154c serves to search the curve pattern matching to an arc segment of the circle having its radius r or r' and apply the curve pattern having the matched arc segment to the user handwriting, thereby extracting rapidly the characteristic of the segment in which the curvature is varied steeply in cooperation with the handwriting combining module 180 which will be describe later.

FIG. 5 is a conceptional diagram showing as an example a method for determining the positions of and the distance between characters and segments consisting of characters which are a Japanese character (katakana style) in the system according to the present invention.

The distance determining module 160 according to the present invention serves to determine the distance between characters and the segments consisting of a character and more particularly serves to measure into numerical values the vertical and horizontal distances between the nearest point marks P between characters and segments of a character, that is, between the point mark P in one character and the adjacent point mark in nearest following character and between the point mark in one segment of a character and the adjacent point mark in nearest following segment of the character and to store them in the database and to transmit the measured numerical values to the handwriting combining module 180 which will be described later.

The position determining module 170 according to the present invention serves to determine the positions in which the characters are aligned and in general set the positions in which the characters are aligned according to personal characteristics considering that the characters handwritten by user may not be aligned in line.

That is, the outermost point mark P of the character, that is, the outermost point mark P for the character in the vertical and horizontal direction is designated and the numerical values corresponding to the outermost point marks P are stored in the database which are transmitted to the handwriting combining module 180 which will be described later, and the numerical values are taken into account for referencing the positions of the characters to deduce other characters of the user handwriting. The position determining module 170 can comprise a function to rotate the feature of the character by a specific angle under the specific circumstance and can measure the distance between characters which may be varied from character to character in cooperation with the distance determining module 160.

The variation measuring module 190 according to the present invention serves to measure the variation degree for each character in the handwriting including the same sentences inputted twice or more times by the user on receiving the user handwriting considering that the feature and position of same character inputted by the user may be varied every character. The variation measuring module 190 comprises an average value calculating unit 191 and a random representation unit 192 for processing the variation measured result.

FIG. 6 is a conceptional diagram showing a status for explaining the step for averaging the variation of the character into an average value in the system according to the present invention.

First of all, the average calculating unit 191 serves to average the varied feature (the number of Point marks, the gradient and the curvature variation for the linear segment or curved segment between the point marks), the distance between and the positions of characters and segments of a character, thereby allowing the user handwriting with averaged numerical values to be combined by the handwriting combining module which will be described later. In this case, the average calculating unit 191 provides a characteristic capable of generalizing uniformly the user handwriting which may be varied on handwriting by a user.

Furthermore, the random representation unit 192 serves to randomly deduce the varied numerical values for segments to allow other characters of user handwriting to be deduced from the stored information having the varied numerical values to represent a various character style from character to character by the handwriting combining module 180 which will be described later, thereby providing more flexibility capable of representing the characters in more vivider writing styles and not in the formulated font.

The handwriting combining module 180 according to the present invention serves to combine other handwriting characters which is not inputted by the user from the information including the coordinate components and so on analyzed by the modules 150, 160, 170, 190.

In particular, the handwriting combining module 180 may comprise a font generating unit 181 for generating a font for inputted characters to allow the generated character to be represented immediately after a time period required to generate a font for the character and a real-time generating unit 182 for combining data inputted from the modules into characters in a real-time, which units may be formed by an integrated unit or separate units.

To combine the handwriting, at first the handwriting inputted from the modules is processed by the module to extract the characteristics of the character and to generate the feature, the distance, and the position of the other characters belonging to the same group as the extracted character based on the characteristics extracted.

The output module 200 according to the present invention serves to output various characters combined by the handwriting combining module 180 to a monitor or a printer and in particular serves to output characters with user handwriting to a monitor or a printer by analyzing the user handwriting and then converting font characters inputted from the documentation program into characters with user handwriting processed by the modules described above according to the present invention.

FIG. 7 is a flow chart showing schematically a process for implementing user handwriting according to the present invention.

The method for implementing user handwriting according to the present invention will be now more in detail described with respect to the accompanying drawing, in particular FIG. 7 and the elements described above.

1. Steps of Inputting User Handwriting and Extracting Characters

The handwriting input module 120 according to the present invention preferably presents the coordinate plate with sample sentences to a user to require a user to handwrite the sample sentences directly on the coordinate plate as the user looks at the sample sentences to recognize easily the user handwriting.

It is preferred that the sample sentences shall contain at least 100 to 200 sentences intended to be inputted by the user and more preferably about 200 sentences to assist to read characters from user handwriting with accuracy.

In particular, as the sample sentences presented to the user are consisted of the characters which had been already recognized in the system according to the present invention, there is no need to separate process for exactly recognizing the sample sentences contrary to the conventional handwriting recognition system. In the present invention, only the characters unclearly inputted by the user will be classified and processed according to the pre-inputted character recognition criterion by the character extracting module 130 according to the present invention, thereby increasing the process rate in character recognition. To this end, to recognize clearly the characters, it is required that the user shall write the sample sentences on the coordinate plate with a scale, not on the customary paper having no scale to extract the characters and the segments of the characters according to the present invention.

That is, it is economical and practical for a faster process that the user handwrites the sample sentences on the coordinate plate from the first time as shown in FIG. 2 which user handwriting will be directly inputted to the handwriting input module and subject to subsequent processing steps, but otherwise the user handwriting written on the customary paper must be converted to the coordinate components on the coordinate plate by the coordinate applying module 140 according to the present invention requiring converting time duration resulting in more delayed process.

2. Step of Determining a Feature of the Character.

As shown in FIG. 4, a continuous line, i.e., run portion R consisting of each character or each segment of the character is analyzed and a bended portion or curved portion is selected by the curve measuring unit 151 and then point marks P are designated to the position in which gradient or variation of the curve line is varied by the point mark designating unit 152 and the continuous line is determined by the feature determining module 150 according to the present invention.

More particularly, when analyzing the English character 'e' expressed in FIG. 4, it is seen that linear and curved lines on the upper part of the character are expressed in an alternate manner. In this case the curve determining unit 151 reads all the coordinate values of specific distances of divided segments consisting of the character 'e' and then distinguishes the segments expressed into a linear line and the segments expressed as a curved line and Point marks P to the position corresponding to an interface between the linear and curved lines are designated by the point mark designating unit 152.

In case of a linear line, the gradient of the linear line is determined by the gradient determining unit 153 and is subject to data processing and then the processed data is stored into the database separately. Also in case of a curved line, the finite point marks are designated by a procedure for determining roughly curvature values and inflection points from the specific coordinate values in cooperation with the curvature determining unit 154.

Preferably, point marks P on the curved lines are roughly designated based on the positions or inflection points in which the curvature are largely varied because the processing rate become slow and the segments between the point marks P become approximately a linear line, thus the curved lines combined become unnatural and have articulated connection if the number of point marks P is too large for a curved line in the upper rounded part of the character 'e' shown in FIG. 4. Furthermore, if it is considered that a curved line between point marks P corresponds to a specific arc segment in a circle having the measured curvature or a circle having its radius r or r' by the curve applying means 154c, the curve applying means 154c according to the present invention applies the arc segment to combine the curved line, thereby providing advantages that it prevents the processing rate from delaying considerably by processing all the black pixel positions in the curved lines consisting of the considerable number of point marks and that it is capable of processing the curved lines with accuracy and rapidity.

3. Step of Determining Distance Between Characters and Segments of a Character.

Referring to FIG. 5, a method for determining a distance between characters and segments of a character, for example, 'グッド' in a Japanese language will be described.

For the 'グ' in a 'グッド' (meaning 'good' in English language), the horizontal distance between a rightmost point of a left segment ク near a right segments "in the 'グ' and a leftmost point of a right segments" to determine the distance between the segments of the character 'グ' (i.e., the distance between double marks expressed as "and the segment ク in which the black pixel elements is continuously connected except the double marks" in 'グ') is measured and the vertical distance between a lowermost point of the segment "and an uppermost point of the left segment ク near the segment" is measured and then measured values are stored in the database. The process for the 'ッ' and 'ド' will be also performed in the same manner as the above process for 'グ' and then measured values processed for the 'ッ' and 'ド' are also stored in the database. The horizontal and vertical distances between most adjacent point marks P of the outermost point marks P of the characters and segments of the characters are measured and are subject to data processing.

Furthermore, measuring the distances between the 'グ' and 'ッ' and 'ド' characters may be also performed by determining the distance between the rightmost point of 'グ' and the leftmost point of 'ッ' and the distance between the rightmost point of 'ッ' and the leftmost point of 'ド'. Like this, determining the distance between the characters and the segments of the characters will be made by determining the horizontal and vertical distances between the nearmost points of the characters and the segments of the characters intended to be measured and then the measured values are stored in the database.

3. Step of Determining a Position of Characters.

A step of determining a position of the characters may be performed in parallel with the step of determining the distance between the characters and the segments of the characters. As will be seen in FIG. 5, the positions of the characters and the segments of the characters are measured with the outermost point marks around the characters and the segments of the characters in a horizontal and vertical direction and then the measured values for the positions are stored in the database.

Furthermore, the characters and the segments of the characters may be rotated in a specific direction by a value set by the user to recognize easily the characters and the segments of the characters in line with, for example, the horizontal direction.

4. Step of Measuring a Variation for the Features, Distances and Positions of the Characters and the Segments of the Characters.

The sample sentences containing the same sentences as the sentences which have been already inputted by the handwriting input module 120 will be presented to the user on the coordinate plate to require the user to handwrite the sample sentences 1 or more times to receive a plurality of handwriting style for the same characters from the user.

As shown in FIG. 6, the features of user handwriting and the distances and positions between the characters and the segments of the characters of the user handwriting may be different although it is the handwriting for the same character by the same user. Therefore, to recognize the user handwriting with accuracy, it is required that user handwriting for the same character should be inputted for example 3 times. To this end, a plurality of numerical values in the database obtained by the feature determining module 150, the distance determining module 160, and the position determining module 17 may be averaged by the average calculating unit 191 to extract representative averaged handwriting.

Furthermore, to express the various user writing styles in addition to user handwriting averaged by the average calculating unit 191, the information for user handwriting having respective different characteristics obtained by the random representation unit 192 may be stored in the database and transmitted to the handwriting combining module 180. The handwriting combining module 180 may combine randomly the characteristic handwriting characters and segments of the user handwriting having the random variation to express the various user handwriting styles with different variation.

With these functions, the system can represent a variety of user handwriting styles which are more vivider and not in the formulated font by expressing various handwriting styles from the same characters and the deduced characters.

5. Step of Combining Various Handwriting Based on the Reference Handwriting.

The above serial procedure is to deduce/combine various handwriting by inputting the representative reference handwriting to a minimum. The step of combining the handwriting for user handwriting is performed by the handwriting combining module 180.

In particular, when expression 'ㅏ' has been inputted according to the above criterion, the segment "which has been input later by the user will become expressed at a proper distance and position in a right direction from the segment 'ㅏ' which has been input already to represent a completed character 'ㅑ', considering a basic distance which has been already recognized for another character, for example, 'ㅧ', (i.e., the distance between a point mark of the segment" and a point mark of the segment 'ㅧ' in the character 'ㅧ').

This special detailed procedure results from a premise that the system according to the present invention shall receive a minimum number of characters, i.e., about 100 to 200 characters.

The handwriting combing procedure is followed by the font generating unit 181 which generates fonts corresponding to all the characters which are already completely recognized as a pre-operation from the handwriting database obtained by the above serial handwriting analyzing steps.

Furthermore, if the database comprises any handwriting already obtained by the handwriting analyzing steps for the characters pre-inputted by the documentation program stored in the computer, the handwriting drawn by the documentation program may be converted into user handwriting according to the present invention in a real-time in cooperation with the documentation program by the real-time generating unit 182.

The above 2 handwriting combining methods will be varied according to the system usage or user convenience.

6. Step of Otputting Handwriting.

With the function of the handwriting combining module 180, the characters represented by the documentation program capable of cooperating with the system according to the present invention may be printed to a monitor or to a printer, thereby the user may confirm that the user's handwriting made just before according to the present invention has been converted to his own handwriting document printed.

7. Step of Adding Other Characteristics to the Handwriting.

User handwriting may have different thickness and clearness (gray level) of the line in the writing in many cases. The thickness and clearness of the line may depend on the recognition performance of the handwriting input module 120, i.e., the specification or the recognizing capacity of the handwriting input module. Therefore, the system according to the present invention may be adapted to recognize the thickness and clearness of the line although the specific detailed description may be omitted.

As described heretofore, the elements and its operations of the system and method for implementing the user handwriting according to the present invention has been described with respect to the drawings, which are not intended to restrict the invention but explain the invention. Therefore, it is obvious that as the modification and change may be made within the scope of the invention without deviating the technical spirit of the invention, the modification and change will belong to the invention.

As described above, the system and method for implementing user handwriting according to the present invention has advantages that:

1) a numerous number of characters can be accurately represented in spite of the minimum number of handwriting characters of a user and the memory capacity of the system will be reduced and the processing rate of the system will be faster;

2) various and vivid handwriting styles of the user will be implemented to conform to varied user handwriting; and 3) the handwriting characters represented in various user handwriting will be represented arbitrarily by accurately and fast measuring and outputting the distance between characters and the position and the feature of characters.

The invention claimed is:

1. A system for implementing user handwriting, comprising:
   a handwriting input module for receiving user handwriting including at least 100 to 200 characters by a user with sample sentences;
   a feature determining module having a curve measuring unit for recognizing a curve condition of a run portion R in each character and its segments in the handwriting, a point mark designating unit for designating a point mark P to a curved position of the run portion R recognized by the curve measuring unit, and a curvature determining unit including a curvature measuring means for designating only a specific number of the point marks P if the run portion R is a curved line;

a distance determining module for determining a vertical distance between an uppermost point mark and a lowermost point mark between 2 characters and their segments and a horizontal distance between a leftmost point mark and a rightmost point mark between 2 characters and their segments;

a position determining module for determining positions of the uppermost and lowermost point marks and the leftmost and rightmost point marks between 2 characters and their segments;

a handwriting combining module for combining several handwriting bases on data recognized by the feature determining module, the distance determining module and the position determining module; and a handwriting output module for outputting handwriting combined by the handwriting combining module.

2. The system for implementing user handwriting according to claim 1, further comprising:

a variation measuring module having an average calculating unit for averaging handwriting data recognized by the feature determining module, the distance determining module and the position determining module from handwriting received one or more times from the handwriting input module.

3. The system for implementing user handwriting according to claim 1, wherein the variation measuring module further comprises a random representation unit for randomly representing the handwriting data recognized by the feature determining module, the distance determining module and the position determining module from the handwriting received one or more times from the handwriting input module into a random handwriting to allow the handwriting to be combined by the handwriting combining module.

4. The system for implementing user handwriting according to claim 1, wherein the handwriting combining module comprises a font generating unit for generating a font corresponding to data processed handwriting and a real-time generating unit for combining handwriting received in real-time.

5. The system for implementing user handwriting according to claim 1, wherein the curvature determining unit further comprises an inflection point measuring means for measuring an inflection point by differentiating the curve line.

6. The system for implementing user handwriting according to claim 1, wherein the curvature determining unit further comprises a curve applying means for determining whether a curve determined by the curvature measuring means matches an arc segment of a predetermined circle.

7. The system for implementing user handwriting according to claim 1, wherein the curve applying means comprises a function that selects in a database including predetermined curve lines a curve line connecting a preceding character and a following character in case the handwriting is an English cursive script and applying the selected curve line.

8. A method for implementing user handwriting, comprising:

receiving user handwriting including at least 100 to 200 characters by a user with sample sentences;

determining a feature of each character and its segments by classifying the run portions R into a linear line or a curve line based on a point marks P designated by variation points of the run portions R defined by a unit forming each character and its segments in the handwriting, and then measuring the gradient of the run portion R if the run portion R classified is a linear line and measuring a curvature of the run portion R if the run portion R classified is a curve line;

determining a vertical distance between an uppermost point mark and a lowermost point mark between 2 characters and their segments and a horizontal distance between a leftmost point mark and a rightmost point mark between 2 characters and their segments;

determining a position between 2 characters and their segments;

combining several handwriting base on data obtained by the steps of determining a feature, a distance and a position; and outputting handwriting combined by the step of combining several handwriting.

9. The method for implementing user handwriting according to claim 8, wherein the step of determining a feature comprises determining a curve variation for deciding whether a curve variation around a specific curved line exceeds a certain threshold.

10. The method for implementing user handwriting according to claim 9, further comprising selecting a similar curve line as the curve line having the curve variation in the database including predetermined curve lines in case the curve variation is large determined by the step of determining a curve variation.

* * * * *